United States Patent

[11] 3,585,269

[72] Inventors Johannes Krause
 Hermulheim, near Köln;
 Wilhelm Portz, Kierdorf-Lechenich;
 Gunther Rittershausen, Knapsack, near Cologne, all of, Germany
[21] Appl. No. 845,412
[22] Filed July 28, 1969
[45] Patented June 15, 1971
[73] Assignee Knapsack Aktiengesellschaft
 Knapsack bei Cologne, Germany
[32] Priority Aug. 2, 1968
[33] Germany
[31] P 17 58 759.6

[54] PROCESS OF OPERATING A HOLLOW ELECTRODE FOR USE IN CLOSED, ELECTROTHERMAL REDUCTION FURNACES
3 Claims, 1 Drawing Fig.
[52] U.S. Cl. ................................................. 13/33
[51] Int. Cl. ................................................. H05b 7/00
[50] Field of Search ................................. 13/1, 9, 33, 34, 18

[56] References Cited
UNITED STATES PATENTS
3,101,385 8/1963 Robinson ..................... 13/33
3,471,626 10/1969 Weese et al. ................. 13/18 X Primary Examiner—Bernard A. Gilheany
Assistant Examiner—Roy N. Envall, Jr.
Attorney—Connolly and Hutz ABSTRACT: Operation of a hollow electrode for use in closed electrothermal reduction furnaces by flowing solid raw material therethrough using a stream of gas, and delivering the raw material to the furnace. The flow of material through the hollow electrode is automatically arrested once the gas pressure prevailing inside the furnace, downstream of the hollow electrode, approaches a predetermined limiting value selected so as to correspond to 40—60 percent of the electrode operation gas pressure.

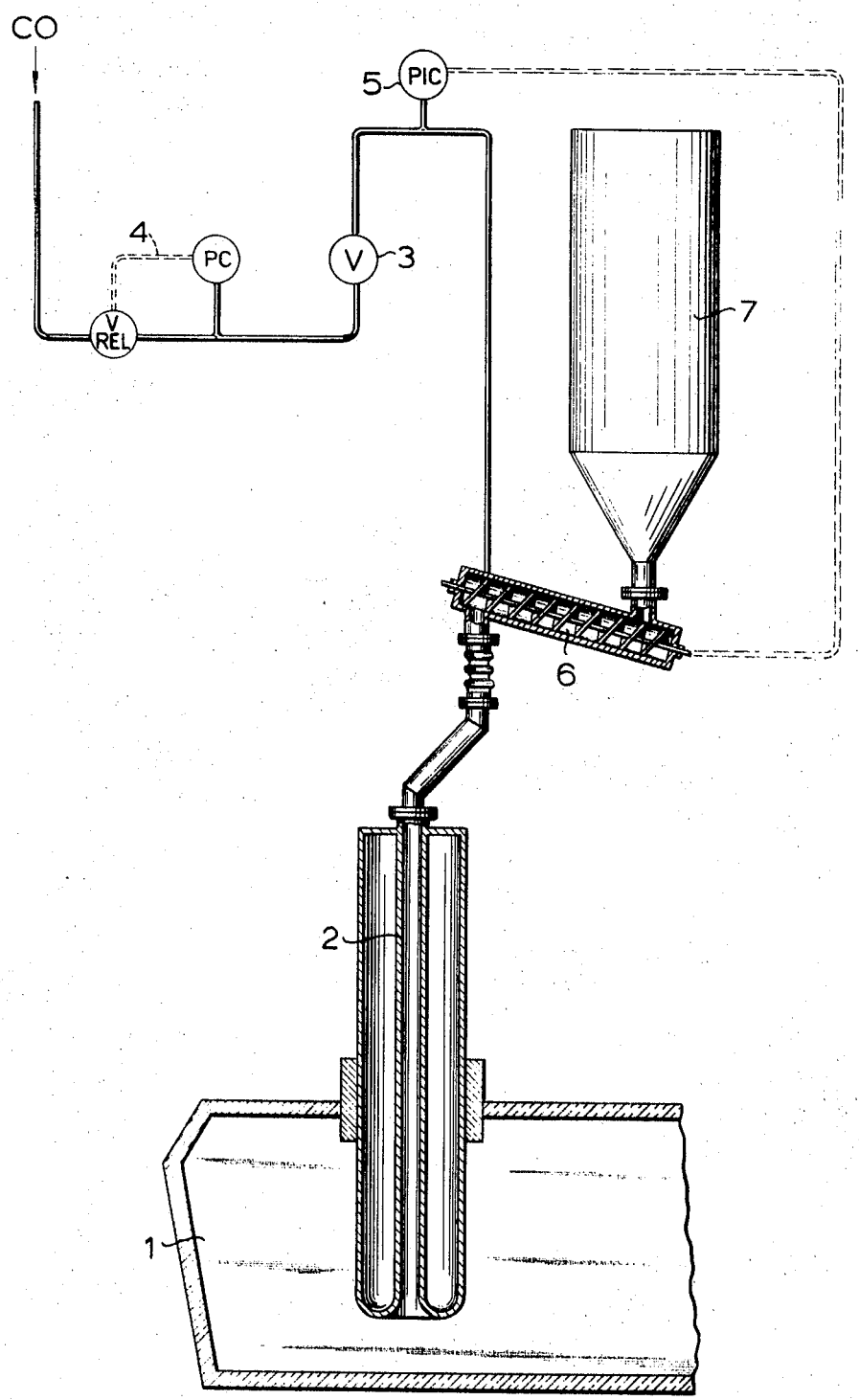

PROCESS OF OPERATING A HOLLOW ELECTRODE FOR USE IN CLOSED, ELECTROTHERMAL REDUCTION FURNACES

It is known that large electrothermal furnaces can be fed with fine particulate raw material using hollow electrodes, which enable the material to be directly introduced into the furnace, without it being carried away by furnace gas. Fine particulate material reacts more rapidly and is less expensive than lumpy material. In industry, it is always obtained by abrasion even when lumpy material is used. The abrasion fines are sieved out and also used in the furnace. The fact that fine particulate material is immediately introduced into the melting pot downstream of the hollow electrode effects cooling of the electrode tip. For the tamped carbon electrode the lower temperature means an up to 50 percent lower consumption rate. A gas tight screw conveyor and a stream of gas are used to supply the furnace with metered quantities of fine particulate material. The gas is used to insure that the hollow electrode passageway or opening near the tip of the electrode, which is dipped in the furnace, is always kept open. Carbon monoxide is the gas generally used for the operation of a hollow electrode. The reason for this is that carbon monoxide is often evolved in electrothermal processes, for example in the production of carbide, phosphorus or ferroalloys. The trend towards the use of always more powerful electrothermal furnaces is quite obvious. However, the volume or capacity of the furnace is not increased at the same rate as the furnace power. This means increased reaction velocities and improved space/time yields for the apparatus. In the process referred to hereinabove, the reaction gases produce a furnace internal pressure near the electrode tip with pressure variations which are the higher the larger the absolute quantity of reaction gas evolved. These pressure variations have been found to exceed the potential pressure of the gas used for operating the hollow electrode. As can be inferred from this, the controlled flow of gas, which travels through the hollow electrode into the furnace and is absolutely needed for the continual delivery of material therethrough, is temporarily retarded or completely interrupted by the counter-pressure prevailing therein, or even outweighed by the furnace internal pressure, with the result that the hollow electrode becomes clogged very rapidly once material commences to accumulate near the electrode tip. When this has occurred, the material accumulating inside the hollow electrode is found to be heated up to reaction temperature. It then cakes together in the electrode of which the passageway is lastingly blocked. The reopening of the electrode passageway is a very costly procedure, or it is necessary to wait until the material accumulated in the clogged portion of the hollow electrode has been consumed by the normal combustion.

The present invention now provides a process which enables the difficulties reported above to be completely obviated and comprises interrupting the supply of material to the furnace once the pressure prevailing inside the furnace is found to exceed a predetermined limiting value. Depending on the furnace type, the limiting value is selected so as to be considerably lower than the pressure of the furnace operation gas and so as to enable the flow of material to be arrested before the furnace internal pressure has increased to a value approaching that of the operation gas. This step reliably prevents the hollow electrode from becoming clogged by fine particulate material supplied therethrough to the furnace and enables the service life of the electrode to be considerably prolonged.

The present process of operating a hollow electrode for use in closed electrothermal reduction furnaces by flowing solid raw material therethrough using a stream of an electrode operation gas and delivering the raw material to the furnace comprises more especially automatically arresting the flow of material through the hollow electrode once the gas pressure prevailing inside the furnace, downstream of the hollow electrode, approaches a predetermined limiting value selected so as to correspond to 40—60 percent of the electrode operation gas-pressure value. A preferred feature of the present process comprises automatically arresting the flow of material through the hollow electrode once the gas pressure inside the furnace approaches a limiting value selected so as to correspond to 50 per cent of the electrode operation gas-pressure value. A further feature of the present process comprises automatically resuming the flow of material once the gas pressure inside the furnace has dropped to a value of less than 50 percent the electrode operation gas pressure-value.

The process of the present invention will now be described with reference to the following Example and the single figure of the drawing which is a schematic diagram of an apparatus for performing a process which is one embodiment of this invention.

EXAMPLE

Calcium carbide is produced in an electrothermal reduction furnace (power input: 55 megawatt) using hollow electrodes for the supply of material to the furnace. An average pressure of 200 mm. water column is found to establish inside the furnace, with irregular pressure variations between minus 10 mm. and 1200 mm. water column pressure, at each of the three hollow electrodes in the furnace (0 mm. water column pressure =1 atmosphere absolute pressure). A pressure regulator completed by dashed conduit 4 between device PC and V/REL is used to maintain an operation gas pressure of 1000 mm. water column, ahead of gas inlet valve 3. The limited quantities of raw material (lime and coal) coming from reservoir 7 through screw conveyor 6 and travelling through hollow electrode 2 establish an internal pressure within furnace 1. With the hollow electrode passageway open, the furnace internal pressure prevails at pressure meter 5 downstream of inlet valve 3 delivering gas to the hollow electrode 2. The dashed conduit between pressure meter 5 and screw conveyor 6 designates the automatic control connection of screw conveyor 6 in response to the pressure detected at meter 5. The gas continues to flow through the electrode as long as the furnace internal pressure prevailing at pressure meter 5 is lower than 1000 mm water column. It is found, however, that firstly the velocity of flow of the gas, and secondly the quantity of gas available for the transport of material, decrease as the furnace internal pressure increases. Once the furnace internal pressure has increased to a value of 500 mm. water column, the gastight screw conveyor 6 supplying fine material to the hollow electrode 2 is switched off to arrest the flow of material, and switched on again as soon as the furnace internal pressure has dropped to a value of less than 500 mm. water column or less than 400 mm. water column, whichever is the limiting value selected in a given case.

We claim:

1. A process of operating a hollow electrode for use in a closed electrothermal reduction furnace by flowing solid raw material therethrough using a stream of an electrode operation gas at a predetermined electrode operation gas pressure, for delivering the raw material to the furnace, which comprises the steps of detecting gas pressure prevailing inside the furnace and automatically arresting the flow of material through the hollow electrode once the gas pressure prevailing inside the furnace, downstream of the hollow electrode, attains a predetermined limiting value selected so as to correspond to 40—60 percent of the predetermined electrode operation gas-pressure value.

2. The process of claim 1, which comprises automatically arresting the flow of material once the gas pressure prevailing inside the furnace attains 50 percent of the predetermined electrode operation gas-pressure value.

3. The process of claim 2, which comprises automatically resuming the flow of material once the gas pressure prevailing inside the furnace has dropped to a value of less than 50 percent of the predetermined electrode operation gas-pressure value.